United States Patent

[15] 3,639,252

Riedel et al.

[45] Feb. 1, 1972

[54] ORANGE-RED EMITTING EUROPIUM-ACTIVATED YTTRIUM STANNATE PHOSPHOR FOR WARM-WHITE BLENDS

[72] Inventors: Ernest Paul Riedel, Murrysville; Thelma J. Isaacs, Pittsburgh, both of Pa.

[73] Assignee: Westinghouse Electric Corporation, Pittsburgh, Pa.

[22] Filed: Jan. 26, 1970

[21] Appl. No.: 5,901

[52] U.S. Cl. .................................................252/301.4 F
[51] Int. Cl. .................................................C09k 1/56
[58] Field of Search........................252/301.4 F, 301.4 R

[56] References Cited

UNITED STATES PATENTS 3,250,722   5/1966   Borchardt ..................252/301.4 R

FOREIGN PATENTS OR APPLICATIONS 1,915,360   10/1969   Germany ..................252/301.4 F Primary Examiner—Robert D. Edmonds
Attorney—A. T. Stratton, W. D. Palmer and Walter Sutcliff

[57] ABSTRACT

The luminescent composition $Y_2Sn_2O_7{:}Eu^{+3}$, exhibits a spectral energy distribution which principally comprises two lines at about 588.6 nanometers and 596.7 nanometers. This composition can be used as a specialty phosphor for this orange emission, or as a blend constituent in efficiently providing well-balanced white light.

3 Claims, No Drawings

NEW ORANGE-RED EMITTING EUROPIUM-ACTIVATED YTTRIUM STANNATE PHOSPHOR FOR WARM-WHITE BLENDS

BACKGROUND OF THE INVENTION

The luminescent composition comprising yttrium oxide activated by a number of lanthanide series rare-earth metals, including europium, is well known in the art. The europium activated embodiment has been used as the red component in color television phosphor screens, and also as a color correcting additive to phosphor blends in fluorescent lamps. The yttrium-europium oxide phosphor remains a relatively expensive item. A yttrium-europium-strontium oxide system has been disclosed in U.S. Pat. No. 3,450,642, wherein the majority of the emitted radiation is of greater than 600 nanometer wavelength.

When a phosphor is used for color correction or for improving the color-rendering characteristic of a phosphor blend it is preferably that this be achieved with as high a contribution as possible to total luminosity. The optimum luminosity is a function of the sensitivity of the human eye to particular visible radiations. Thus, when a long wavelength emitting color-correcting phosphor is utilized it is desired that the emissions be of a wavelength to which the eye is more sensitive to maintain the high luminosity of the blend while effecting the color correction.

SUMMARY OF THE INVENTION

It has been discovered that it is possible to prepare a luminescent composition consisting of $Y_2Sn_2O_7:Eu^{+3}$. The europium is present in an activating proportion and is substituted for a portion of the yttrium. This composition is readily excited to luminescence by ultraviolet radiation with the emission principally comprising two lines at about 588.6 and 596.7 nanometers, with some weaker band emission between 590 and 660 nanometers. The shorter wavelength emission of this composition compared to yttrium-europium oxide assuming comparable quantum efficiency means that the luminosity of the present phosphor itself or of a blend utilizing it will be greater. The trivalent europium activator is preferably substituted for the yttrium in an amount of from about 1 to 10 atom percent.

DESCRIPTION OF THE PREFERRED EMBODIMENT

The phosphor composition of the present invention is prepared for example by thoroughly mixing about 0.92 mole of finely divided yttrium oxide ($Y_2O_3$), about 0.08 mole of finely divided europium oxide ($Eu_2O_3$), and about 2 moles of finely divided tin oxide ($SnO_2$). This raw mix is fired in an atmosphere comprising oxygen, preferably air, at about 1,200° C. for about 24 hours. The firing temperature and time can be readily varied in preparing the luminescent composition. An alternative method of preparation is to coprecipitate the yttrium and europium as mixed oxalates, and fire the coprecipitate with the tin oxide.

The luminescent composition of the present invention is readily excited by 254 nanometer radiation produced in a conventional low-pressure mercury discharge device. The phosphor is also excited to luminescence by a wide range of radiations. The composition can be used alone as a specialty orange-appearing phosphor or in combination as a blend constituent. For example a deluxe warm-white blend can be prepared utilizing the phosphor of the present invention with standard manganese and antimony-activated halophosphate phosphor. The relative proportions of each constituent are varied to determine the chromaticity color-coordinates desired.

The europium content can be widely varied in preparing the composition, but it has been found preferable to substitute the europium for yttrium in a range of from about 1 to 10 atom percent, and preferably about 8 atom percent.

We claim:
1. The luminescent composition $Y_2Sn_2O_7:Eu^{+3}$, wherein $Eu^{+3}$ is substituted for Y in an activating proportion.
2. The composition as specified in claim 1, wherein said europium replaces from about 1 to 10 atom percent of the yttrium.
3. The composition as specified in claim 1, wherein said europium preferably replaces about 8 atom percent of the yttrium.

* * * * *